US011654797B2

(12) United States Patent
Vitte et al.

(10) Patent No.: US 11,654,797 B2
(45) Date of Patent: May 23, 2023

(54) VEHICLE WITH ROTATING DRIVER'S CAB (71) Applicant: ALSTOM Transport Technologies, Saint-Ouen-sur-Seine (FR)

(72) Inventors: Jean-Christophe Vitte, Chagey (FR); Patrick Jeanblanc, Sermamagny (FR); Arnaud Heidet, Belfort (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 295 days.

(21) Appl. No.: 17/090,880

(22) Filed: Nov. 5, 2020

(65) Prior Publication Data
US 2021/0138935 A1 May 13, 2021

(30) Foreign Application Priority Data

Nov. 7, 2019 (FR) ....................................... 1912512

(51) Int. Cl.
B60N 2/14 (2006.01)
B62D 33/063 (2006.01)
(Continued)

(52) U.S. Cl.
CPC ............. B60N 2/146 (2013.01); B60N 2/14 (2013.01); B60N 2/919 (2018.02); B60N 2002/022 (2013.01); B62D 33/0633 (2013.01)

(58) Field of Classification Search
CPC .......... B60N 2/14; B60N 2/146; B60N 2/919; B60N 2/90; B60N 2/005; B60N 2/143; B60N 2/0742; B60N 2002/022; B60N 2002/0204; B62D 33/0633; B62D 33/063; B61C 17/04; B61D 33/0085; B61D 33/0078; B61D 33/0057; B61D 33/00
(Continued)

(56) References Cited

U.S. PATENT DOCUMENTS

2003/0141736 A1* 7/2003 Chernoff .................. B60N 2/14
296/65.01
2006/0061177 A1 3/2006 Billger et al.
(Continued)

FOREIGN PATENT DOCUMENTS

EP 2481653 A1 8/2012
EP 2832618 A1 2/2015
(Continued)

OTHER PUBLICATIONS

INPI Rapport de Recherche Préliminaire for Patent Application No. FR 1912512, Jul. 14, 2020, 2 pp.

Primary Examiner — Keith J Frisby
(74) Attorney, Agent, or Firm — Soquel Group LLC

(57) ABSTRACT

The invention relates to a vehicle comprising a driver's cab (12) comprising a base (14) and a seat (16), the vehicle having a longitudinal direction (X).

The base (14) has a center (20) and a central longitudinal plane (P), the central longitudinal plane (P) extending in the longitudinal direction (X) and passing through the center (20) of the base (14). A projection of the seat (16) in an elevation direction (Z) on the base (14) is comprised in the base (14).

An assembly comprising the base (14) and the seat (16) is designed to rotate with respect to a body of the vehicle about a first axis (D), the first axis (D) extending in an elevation direction (Z). The first axis (D) passes through the center (20) of the base (14).

9 Claims, 8 Drawing Sheets (51) Int. Cl.
*B60N 2/90* (2018.01)
*B60N 2/02* (2006.01)

(58) Field of Classification Search
USPC .................. 180/329, 330, 331, 326, 89.13
See application file for complete search history.

(56) References Cited

U.S. PATENT DOCUMENTS

2016/0001786 A1    1/2016  DiFiore et al.
2016/0152163 A1*   6/2016  Strasdat ................ B60N 2/24
                                                    296/64

FOREIGN PATENT DOCUMENTS

FR      2531116 A1 *   2/1984
FR      2531116 A1     2/1984
GB      1420373 A      1/1976

* cited by examiner

VEHICLE WITH ROTATING DRIVER'S CAB

The present invention relates to a vehicle comprising a driver's cab comprising a base and a seat, the vehicle having a longitudinal direction, the base having a center and a central longitudinal plane, the central longitudinal plane extending in the longitudinal direction and passing through the center of the base, a projection of the seat in an elevation direction on the base being comprised in the base; an assembly comprising the base and the seat being designed to rotate relative to a body of the vehicle about a first axis, the first axis extending in an elevation direction.

GB 1420373 describes a vehicle comprising a driver's cab comprising a seat, a control station and a movable arm, the seat and the control station being mounted on the arm. The arm is designed to move the seat and the control station in rotation between different positions in the cab.

Such a driver's cab therefore makes it possible to have two directions of vision for the driver. This is particularly useful in shunting and work locomotives, the driver being able to change the direction of the cab depending on the shunting and/or the location of the shunting to be performed.

However, such a cab does not provide optimal visibility. The cab thus limits visibility to one side of the track: in particular, the signals on the opposite side of the track are not optimally visible.

An object of the invention is therefore to provide a vehicle comprising a cab offering optimum visibility.

To this end, the invention relates to a vehicle of the aforementioned type, in which the first axis passes through the center of the base.

The seat is designed to be rotated so as to offer two directions of vision for the driver. When the seat is rotated about the first axis of rotation, the location of the seat relative to the base is maintained, so that visibility is maintained in both directions of vision.

The vehicle may also have one or more of the characteristics given below, considered individually or in any technically feasible combination:
- the cab has at least two driving configurations, the assembly being pivoted between the driving configurations of the cab, the seat having a median plane, the median plane of the seat being parallel to the central longitudinal plane and spaced apart from the central longitudinal plane by a distance greater than 0.75 m in each of the driving configurations of the cab;
- the central longitudinal plane delimits a first side of the base and a second side of the base, the seat median plane being located on the first side of the base in at least one of the driving configurations of the cab and on the second side of the base in at least one of the other driving configurations of the cab;
- the assembly is movable between at least a forward position and a rear position, the assembly being rotated through an angle equal to 180° about the first axis between the forward position and the rear position;
- the assembly is suitable for rotating about the first axis over an angular range less than or equal to 270°;
- the seat is designed to rotate relative to the base about a second axis, the second axis extending in the elevation direction, the second axis being distinct from the first axis;
- the base comprises a platform, the seat resting on the platform via a secondary bearing system, the secondary bearing system comprising at least one locking member of the secondary bearing system in at least two positions of the seat relative to the platform;
- the seat is designed to rotate around the second axis over an angular range equal to 90°;
- the base rests on a fixed support relative to the body in the elevation direction, the base resting on the support via a bearing system, the bearing system comprising at least one locking member of the bearing system in at least one position of the base in relation to the support;
- the cab comprises a console, the console being arranged to be fixed relative to the seat.

Other features and advantages of the invention will become apparent upon reading the following description of embodiments of the invention, given by way of example only and with reference to the drawings in which.

We define a longitudinal direction, a transverse direction and an elevation direction usually relative to a vehicle. The longitudinal direction X is the normal direction of movement of the vehicle. The elevation direction Z is perpendicular to the running plane of the vehicle. The transverse direction Y is perpendicular to the longitudinal X and elevation Z directions.

A front side and a rear side of the vehicle are arbitrarily defined with respect to the longitudinal direction X.

Figure 1:
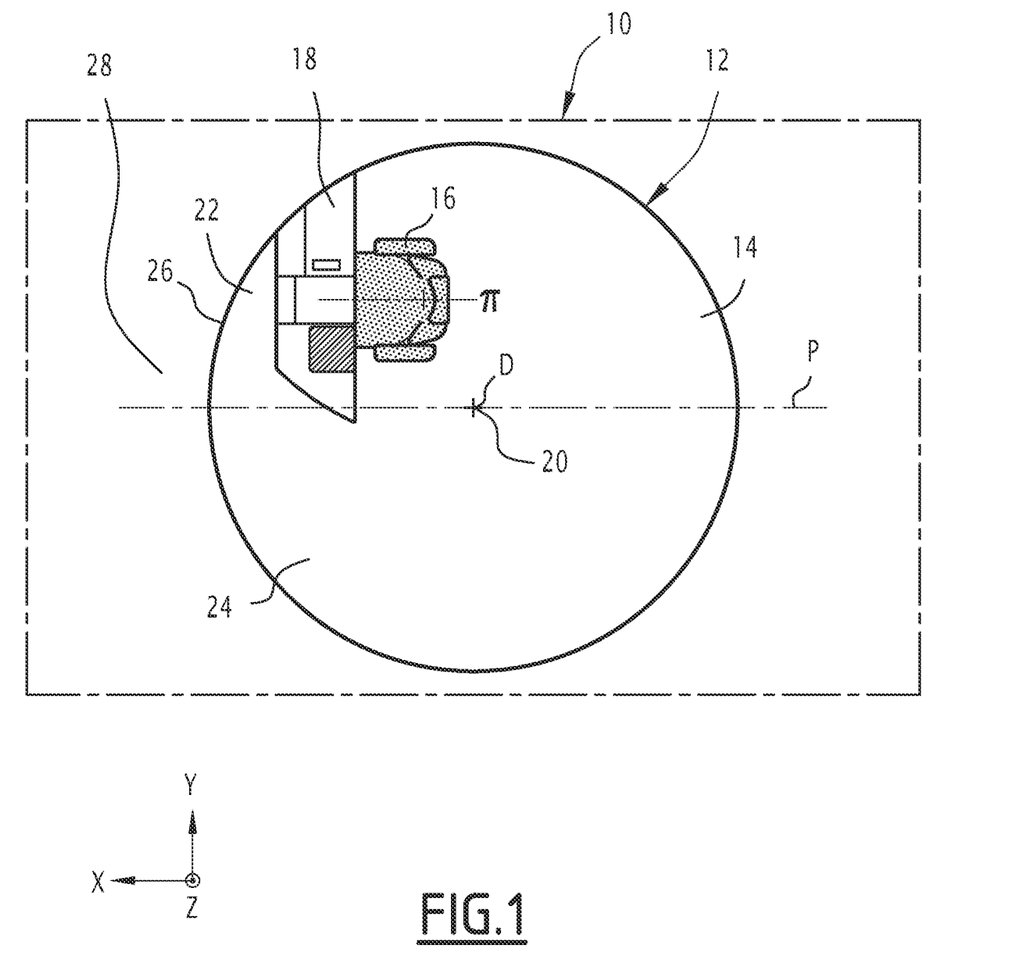
FIGS. 1 and 2 are schematic views of a car of a vehicle according to a first embodiment of the invention, comprising a cab shown in two different positions.
Figure 2:
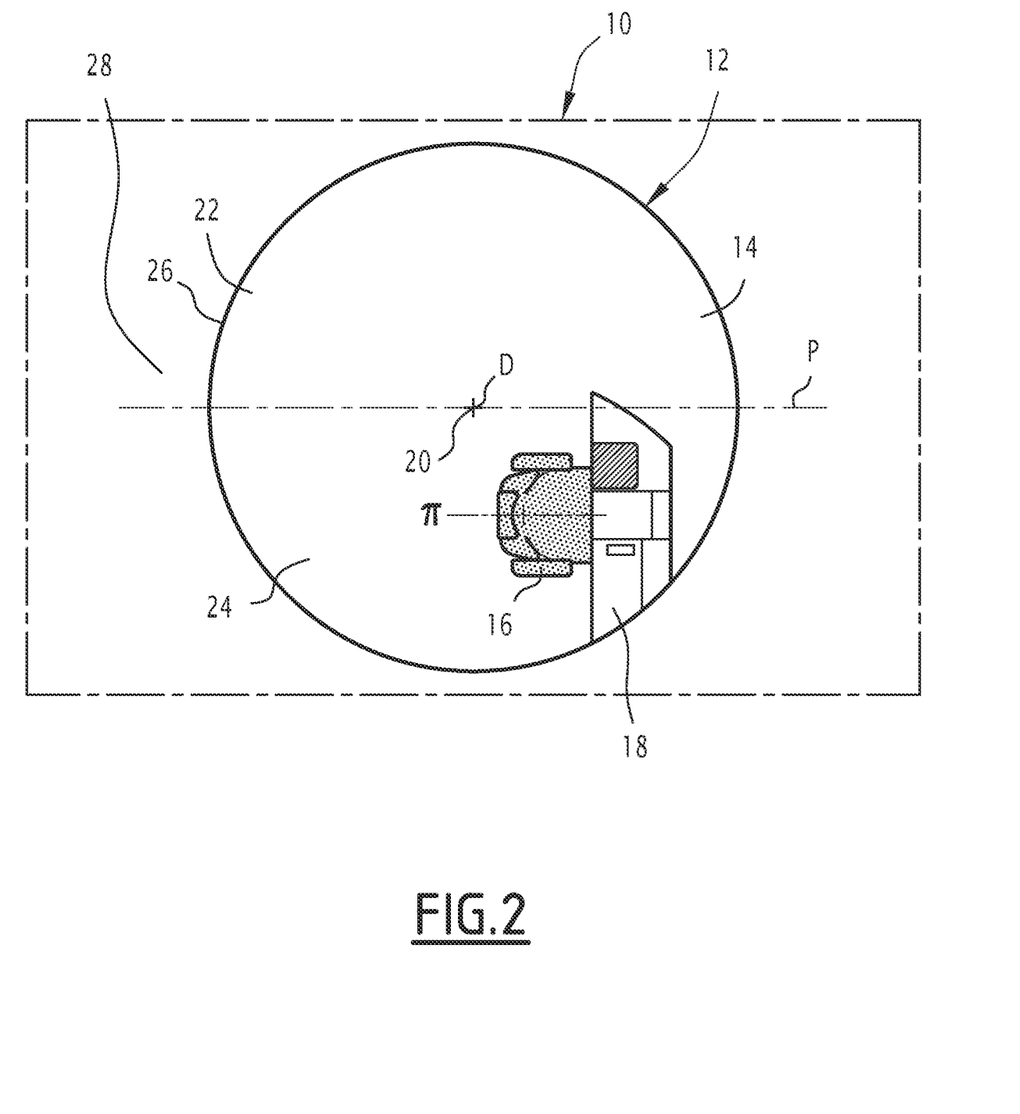
Figure 3:
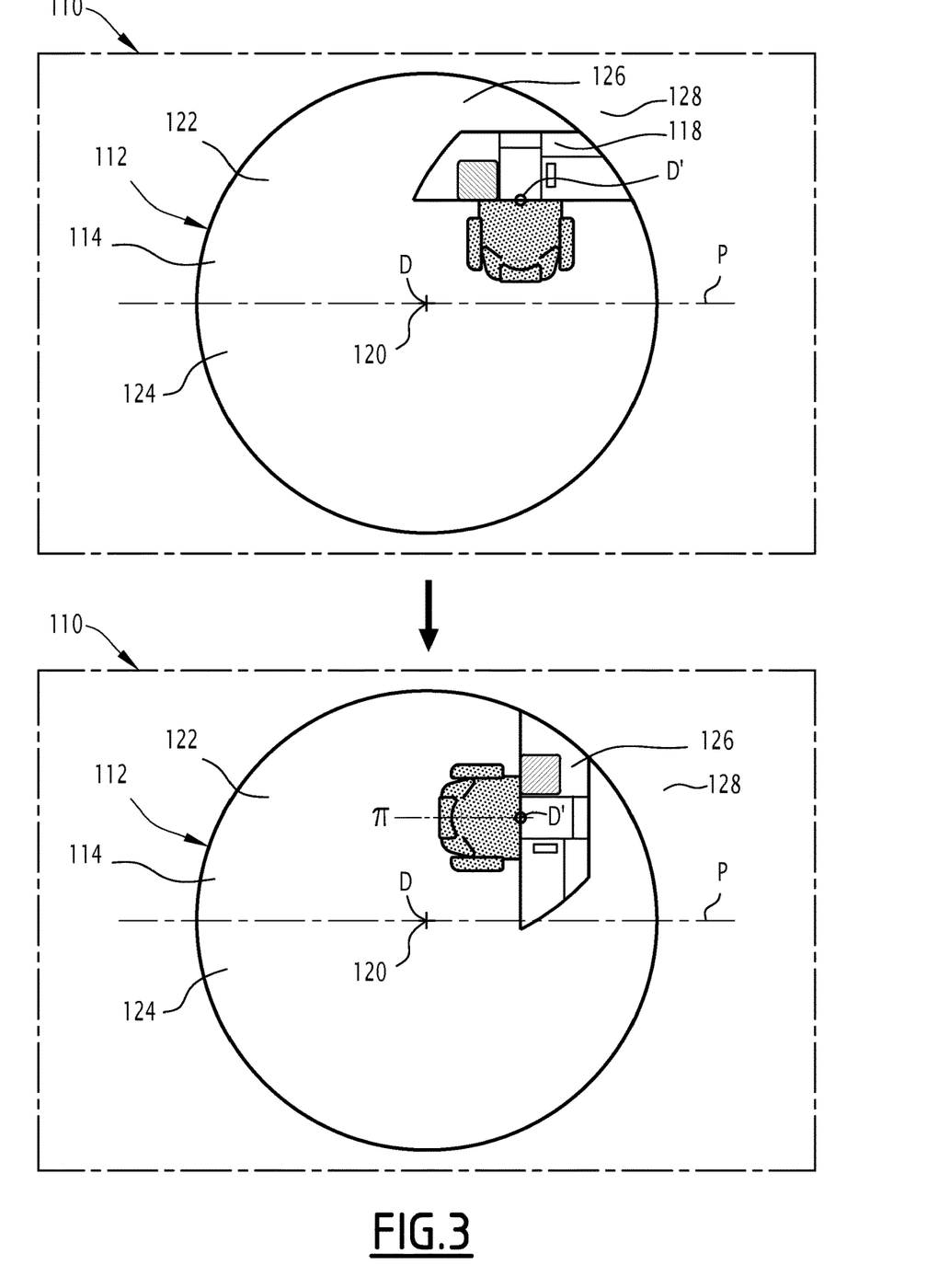
FIGS. 3, 4, 5 and 6 are schematic views of a car of a vehicle according to a second embodiment of the invention, comprising a cab shown in various positions.
Figure 4:
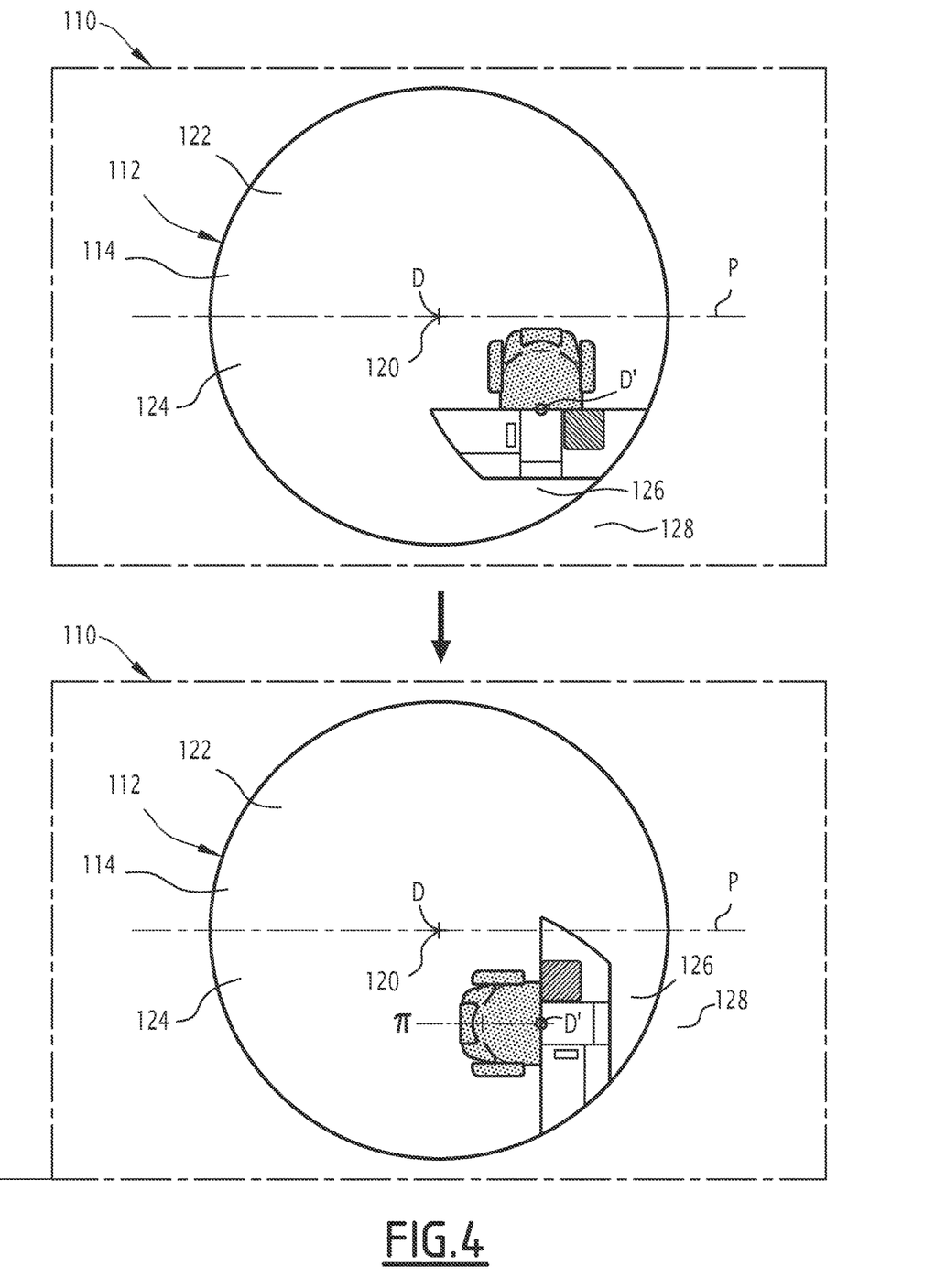
Figure 5:
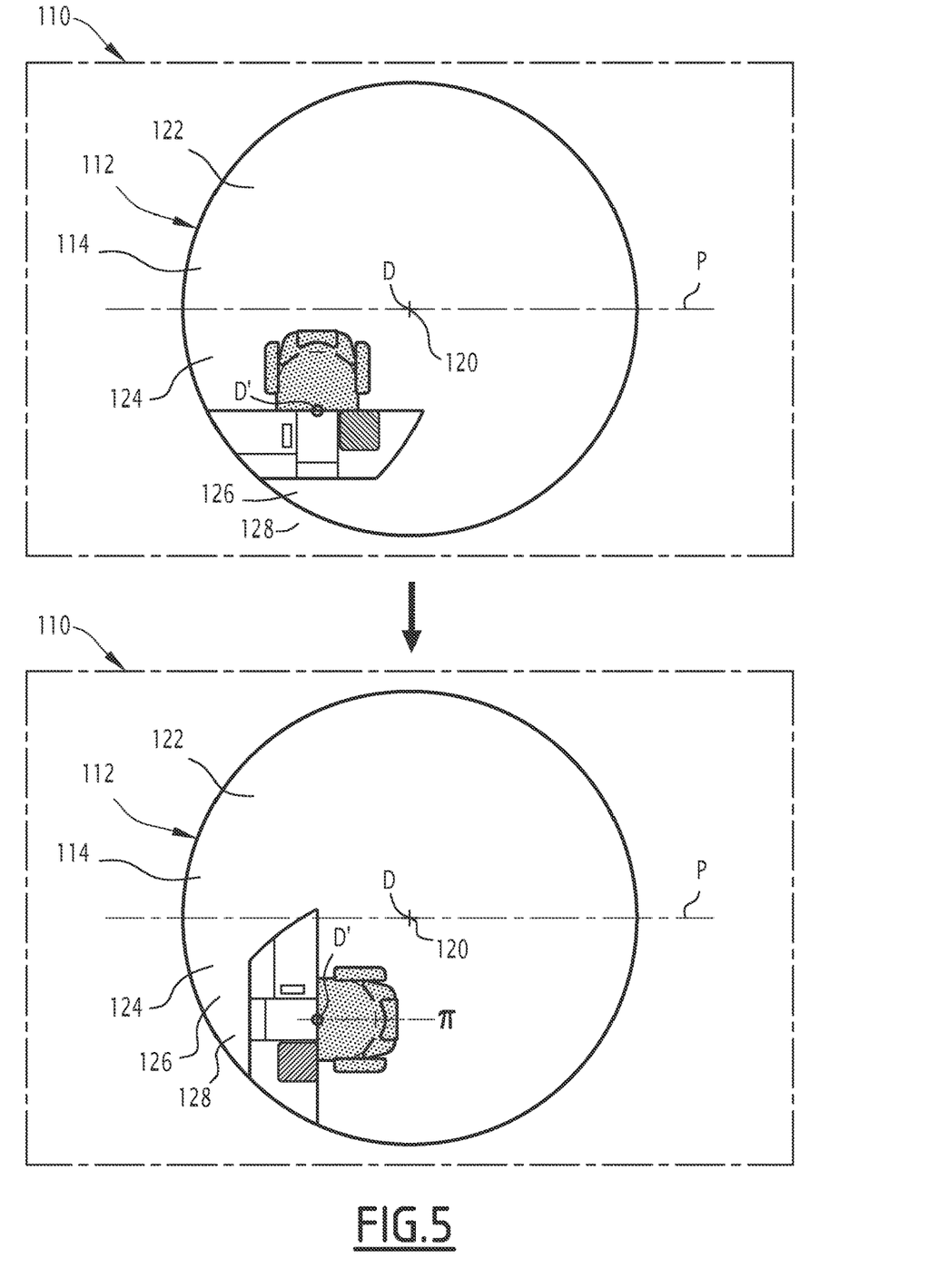
Figure 6:
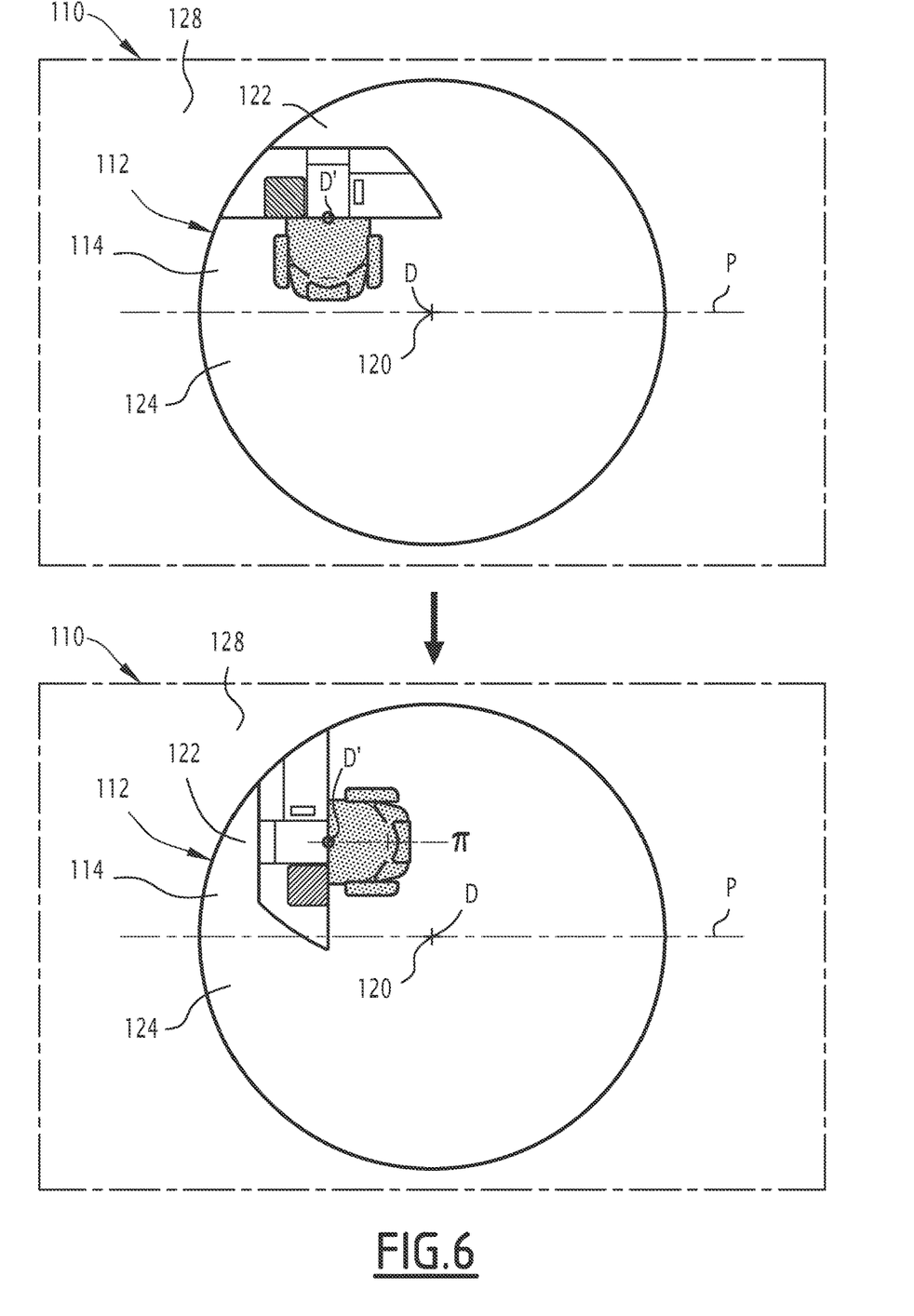

A car 10 of a vehicle according to a first embodiment of the invention is shown in FIGS. 1 and 2.

The car 10 comprises a driver's cab 12 comprising a base 14 and a seat 16.

The cab 12 further includes a console 18.

The base has a center 20, more particularly a geometric center, and a central longitudinal plane P.

The central longitudinal plane P is defined as the plane extending in the longitudinal direction X and passing through the center of the base 14.

The central longitudinal plane P defines a first side 22 of the base 14 and a second side 24 of the base 14.

The base comprises, in this case consists of, a platform 26.

The platform 26 is circular in shape, the geometric center 20 of the base 14 being the center of the circle formed by the platform 26.

The base 14 is designed to rotate with respect to the body of the car 10 along a first axis D.

The first axis D extends in the elevation direction Z.

The first axis D passes through the center 20 of the base 14.

The base 14 is designed to rotate about the first axis D relative to the support 28 over an angular range.

The angular range of the base 14 relative to the support 28 is greater than or equal to 180°.

The angular range of the base 14 relative to the support 28 is less than or equal to 270°.

The angular range of the base 14 relative to the support 28 is here substantially equal to 180°. The term "substantially equal" is understood to mean a difference of less than 5°.

The base 14 is designed to rotate about the first axis D between two positions relative to the support 28, shown in FIGS. 1 and 2 and arbitrarily called the front position and the rear position.

The rear position corresponds to a rotation of 180° from the front position about the first axis of the base 14 relative to the support 28.

The base 14, in this case the platform 26, rests on a fixed support 28 in the elevation direction Z. The support 28 is fixed relative to a body of the car 10.

Figure 7:
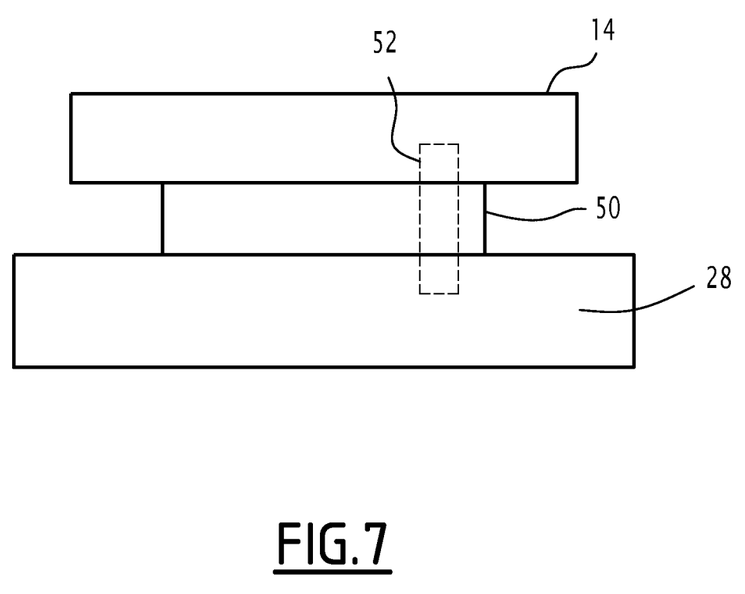
FIG. 7 is a schematic view of the bearing system.

The base 14 rests on the support 28 via a bearing system 50, so as to allow rotation of the base 14 relative to the support 28.

The bearing system 50 comprises a guide member, for example, a bearing, a ball bearing and/or a roller bearing.

The bearing system is, for example, greased so as to promote the rotation of the base 14 relative to the support 28.

The bearing system here comprises an actuator provided to control the rotation about the first axis D. The actuator may be actuated and/or controlled remotely, for example, by a driver using the cab.

The passage from the rear position to the front position is achieved by a rotation in a given direction between the trigonometric direction and the clockwise direction, the passage from the front position to the rear position being carried out in the opposite direction.

This makes it possible in particular to limit possible entanglement of any cables passing between the support 28 and the base 14.

The bearing system 50 further comprises at least one locking member 52 of the bearing system in at least two positions of the base 14 relative to the support 28, more particularly in the front position and the rear position.

The locking member 52 comprises a retractable protruding member and two corresponding indentations.

The retractable protruding member is carried by either the base 14 or the support 28. It is movable between a deployed position in which the protruding member protrudes from either the base or the support in the direction of the support or of the base and a retracted position in which the protruding member is at least partially retracted into either the base 14 or the support 28 relative to the deployed position, i.e. the dimension of the protruding part of the retractable protruding member in the retracted position is less than the dimension of the protruding part of the retractable protruding member in the deployed position.

The two corresponding indentations are arranged at 180° relative to each other with respect to the first axis D.

The retractable protruding element 52 is designed to interact with, or more particularly to fit into, one of the indentations when the base 14 is in the front position and with the other of the indentations when the base 14 is in the rear position, so as to block the rotation of the base 14 relative to the support 28.

The locking member comprises an actuator (not shown) capable of retracting the retractable protruding member, in particular during a rotation of the base 14 relative to the support 28, so as to allow said rotation.

The seat 16 is solidary in rotation about the first axis D with the base 14. Thus, when the base 14 begins to rotate about the first axis D, the seat 16 is also driven in rotation about the first axis D.

The projection of the seat 16 in the elevation direction Z on the base is comprised in the base 14. This makes it possible in particular to limit the size of the cab outside the base 14.

The seat 16 has a median plane π.

In the front position and in the rear position of the base 14, the median plane π is parallel to the central longitudinal plane P and spaced apart from the central longitudinal plane P by a distance greater than 0.75 m, more particularly between 0.75 m and 1.25 m.

The median plane π of the seat 16 is located on the first side 22 of the base in the front position of the base 14 and on the second side 24 of the base 14 in the rear position of the base 14.

In the example shown, the seat 16 is located outside the central longitudinal plane P in the front position and in the rear position of the base, i.e. the central longitudinal plane P does not intersect the seat 16.

The seat 16 is here located to the right of the first side 22 in the elevation direction Z in the front position of the base 14 and to the right of the second side 24 in the elevation direction Z in the rear position of the base 14. By this is meant that the projection of the seat in the elevation direction on the base is respectively comprised in the first or the second side of the base 14.

This allows the seat to be located on a given driving side, for example, suitable for the country in which the vehicle is intended to be driven.

The seat is arranged such that, in the front position of the base 14, a driver seated in the seat 16 has optimum visibility on the front side in the longitudinal direction X and that, in the rear position, the driver has optimum visibility of the rear side in the longitudinal direction X.

This makes it possible to have two driving directions on the same vehicle.

More particularly, the seat 16 is designed to hold the driver such that his sagittal plane extends in the longitudinal direction X in the front position and in the rear position.

The console 18 is provided for controlling actions or maneuvers of the vehicle from the cab.

The console 18 comprises for example at least one command to control the position of the base relative to the car 10.

The console 18 extends facing the seat 16, so that a driver seated in the seat 16 is able to use the console, for example, to control maneuvers.

The projection of the console 18 in the elevation direction Z on the base 14 is comprised in the base 14. This makes it possible in particular to limit the size of the cab outside the base 14.

The console 18 is solidary in rotation about the first axis D with the base 14. Thus, when the base 14 rotates about the first axis D, the console 18 is also driven in rotation about the first axis D.

Thus, the assembly formed by the base 14, by the seat 16 and here by the console 18, is movable in rotation about the first axis D, the seat 16 and here the console 18 being designed to be driven in rotation by the base 14 bout the first axis D.

The assembly is thus movable between a front position and a rear position, the assembly being rotated through an angle equal to 180° about the first axis D between the front position and the rear position. The front, respectively rear, position of the assembly corresponds to the position of the assembly when the base is in the front, respectively rear, position.

The term "equal" is understood here to mean a difference of less than 5°.

A method of using a cab 12 as described above will now be described.

The cab 12 has two driving configurations corresponding to the front and rear positions of the assembly formed by the base 14, the seat 16 and the console 18.

The cab 12 is initially placed in one of the driving configurations.

When desired, the cab is moved to the other driving configuration.

More particularly, the retractable protruding member is moved from the deployed position to the retractable position.

The actuator is activated, for example, from the console by the driver.

The base 14, and thus the seat 16 and the console 18, perform a rotation of 180° about the first axis D relative to the car.

The base 14, seat 16, and console 18 are moved to the other front or rear position.

The retractable protruding member is then moved from the retractable position to the deployed position.

Thus, the direction of vision of the driver seated in the seat 16 is modified giving him visibility adapted to the maneuver or operation in progress.

A second embodiment of a vehicle according to the invention will now be described with reference to FIGS. 3 to 6.

Identical or similar elements are numbered with the same reference incremented by 100.

Only the elements through which this second embodiment differs from the first embodiment will now be described.

The angular range of the base 114 relative to the support 128 is here equal to 270°.

The base 114 is able to be moved about the first axis D between four positions relative to the body of the car, as shown in FIGS. 3, 4, 5 and 6 and arbitrarily called the rear left position, rear right position, front left position, and front right position respectively.

The rear left, rear right, front left and front right positions correspond to successive rotations of 90°, here within 5°, in the same direction about the first axis.

The passage from one position to the adjacent position is possible by rotating 90° in one direction about the first axis and/or by rotating 270° in the opposite direction about the first axis according to the angular range.

The bearing system comprises at least one locking member for locking the bearing system in the rear left, rear right, front left, front right positions of the base 114 relative to the support 128.

The locking member comprises a retractable protruding member and four corresponding indentations.

The four corresponding indentations are disposed at 90° relative to each other relative to the first axis D.

The retractable protruding member is designed to interact with, or more particularly fit into, one of the respective indentations when the base 114 is in each of the rear left, rear right, front left, and front right positions.

The seat 116, and here the console 118, are also designed to rotate relative to the base 114 about a second axis D', the second axis D' being distinct from the first axis D.

The seat 116 and the console 118 are solidary in rotation about the second axis D'.

The second axis D' extends in the elevation direction Z.

The intersection between the base 114 and the second axis D' is a point on a diameter of the base 114, the diameter forming an angle of 45° with the longitudinal X and transverse Y directions in each of the positions of the base 114 relative to the vehicle body.

The second axis D' has a non-zero intersection with the seat 116 and here the console 118. More specifically, the second axis D' intersects the console 118 at an edge of the console 118 facing the seat 116.

The seat is designed to rotate about the second axis D' over an angular range equal to 90°, here within 5°.

The seat is designed to be moved in rotation about the second axis D' between a basic position and a complementary position.

The complementary position corresponds to a rotation of 90°, here within 5°, about the second axis D' of the seat 116 relative to the base 114 from the basic position.

Figure 8:
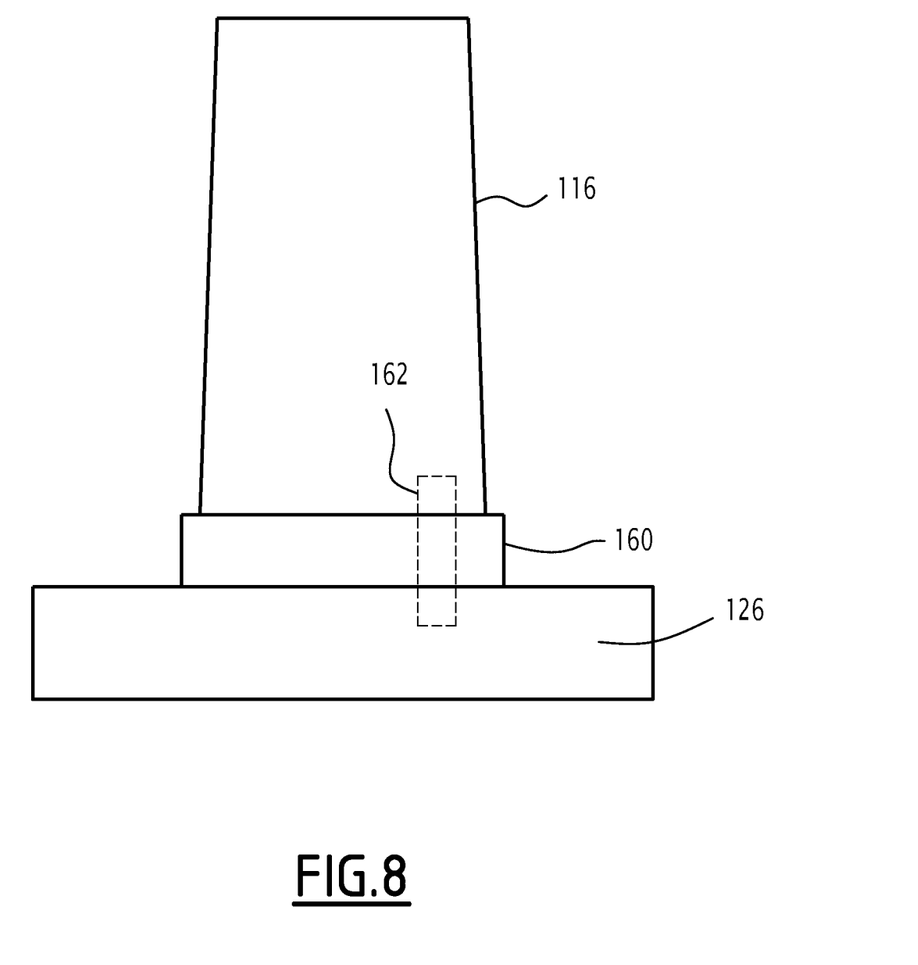
FIG. 8 is a schematic view of the secondary bearing system.

In the present embodiment, the seat 116, and here the console 118, rest on the base 114 via a secondary bearing system 160.

More particularly, the seat 116, and here the console 118, are solidary in rotation with a sub-platform, the second axis D' passing through a center, here the geometric center, of the sub-platform.

The sub-platform here has a circular shape.

The sub-platform is cut into the platform, so that the sub-platform and the platform together form a disc.

The sub-platform has an upper surface flush with the upper surface of the platform.

The sub-platform rests on the platform 126 relative to the secondary bearing system.

The bearing system 160 comprises an actuator designed to control rotation about the second axis D'. The actuator may be operated and/or controlled remotely, for example, by a driver using the cab.

The passage from the basic position to the complementary position is carried out by a rotation in a given direction between the trigonometric direction and the clockwise direction, the passage from the complementary position to the basic position being carried out in the opposite direction.

This makes it possible in particular to limit possible entanglement of any cables passing between the base 114 and the seat 116 and/or the console 118.

The secondary bearing system 160 further comprises at least one locking member 162 of the secondary bearing system 160 in at least two positions of the seat, and here of the console, relative to the base 114, more particularly in the basic position and the complementary position.

The locking member 162 comprises a retractable protruding member and two corresponding indentations.

The retractable protruding member is carried by either the base 114 or the sub-platform. It is movable between a deployed position in which the protruding member protrudes from either the base or the support in the direction of the support or the base and a retracted position in which the element is at least partially retracted into one of the base 114 or the sub-platform relative to the deployed position, i.e. the dimension of the protruding portion of the retractable protruding member in the retracted position is less than the dimension of the protruding part of the retractable protruding member in the deployed position.

The two corresponding indentations are disposed at 90°, here within 5°; in relation to one another in relation to the second axis D'.

The retractable protruding member is designed to interact with, or more particularly to fit into, one of the indentations when the seat 116 is in the basic position and with the other of the indentations when the seat 116 is in the complementary position.

The locking member comprises an actuator (not shown) capable of retracting with the retractable protruding member, in particular during a rotation of the seat 116 relative to the base 114, so as to allow said rotation.

A method of using a cab according to this second embodiment will now be described.

The cab 112 has four driving configurations, each driving configuration corresponding to a respective position of the assembly formed by the base 114, the seat 116 and the console 118 being among the rear left, rear right, front left and front right positions.

In each driving configuration of the cab 112, the seat 116 and the console 118 are in one of the basic and complementary positions such that the seat 116 is so disposed that the sagittal plane of a driver in the seat 116 extends in the longitudinal direction X.

More particularly, if the assembly is in the front right position or in the rear right position, the seat 116 is in the basic position relative to the base 114, while if the assembly is in the front left position or in the rear left position, the seat 116 is in the complementary position relative to the base 114.

In each driving configuration of the cab 112, the median plane π of the seat 116 is parallel to the central longitudinal plane P and spaced apart from the central longitudinal plane P by a distance greater than 0.75 m, more particularly between 0.75 m and 1.25 m.

The cab 112 is initially placed in one of the driving configurations.

If a user wishes to change the direction of vision of the driver with respect to the longitudinal direction X without changing the driving side with respect to a track, i.e. to change from the rear left position of the base 114 to the front left position or vice versa, or from the rear right position to the front right position or vice versa, the assembly formed by the base 114, the seat 116 and the console 118 is rotated through 180° about the first axis D.

The cab 112 is then moved to another of the driving configurations.

This use is equivalent to the first embodiment.

If a user wishes to change the direction of vision of the driver relative to the longitudinal direction X by changing the driving side relative to a track, the assembly formed by the base 114, the seat 116 and the console 118 is rotated through 90° or 270° about the first axis D according to the desired final position, while the seat 116 and the console 118 are rotated with respect to the base 114 through 90° about the second axis D'.

The cab 112 is then moved to another of the driving configurations.

The rotation about the first axis D is, for example, carried out first and then the rotation about the second axis D' is carried out secondly.

Alternatively, the rotation about the second axis D' is carried out first and the rotation about the first axis D is carried out secondly.

Alternatively, the rotation about the first axis D and the rotation about the second axis D' are performed simultaneously.

Changing the driving side relative to a driver seated in the seat makes it possible in particular to adapt the driving position to a change of railway network which would allow better visibility on a different driving side, for example due to a change of country.

In each of the cases described above, the direction of rotation about the first axis D is chosen relative to the maximum angular range.

More particularly, the angular range of the assembly formed by the base 114, the seat 116 and the console 118 with respect to the car is equal to 270°, here within 5°, so that to pass from a given initial position to a given final position, a single direction of rotation is possible about the first axis D.

This makes it possible in particular to limit the possible entanglement of any cables passing between the support 128 and the base 114.

For each of the rotations, the corresponding retractable protruding member is moved from the deployed position to the retracted position, the corresponding actuator is activated, the assembly of the base 114, the seat 116 and the console 118 or the seat 116 and the console 118 perform the given rotation, then the retractable protruding member is moved from the retracted position to the deployed position.

The various elements of the cab are therefore designed to be moved so that the cab offers two possible directions of vision for the driver, while maintaining the optimum configuration of the cab for the track for optimum visibility for the driver.

Such a cab therefore makes it possible to facilitate maneuvers and prevent possible accidents by improving the driver's visibility.

The invention claimed is:

1. Vehicle comprising a driver's cab comprising a base and a seat, the vehicle having a longitudinal direction,
    the base having a center and a central longitudinal plane, the central longitudinal plane extending in the longitudinal direction and passing through the center of the base,
    the projection of the seat in an elevation direction on the base being comprised in the base;
    an assembly comprising the base and the seat being designed to rotate relative to a body of the vehicle about a first axis, the first axis extending in an elevation direction,
    the first axis passing through the center of the base,
    wherein the cab has at least two driving configurations, the assembly being rotated between the driving configurations of the cab, the seat having a median plane, the median plane of the seat being parallel to the central longitudinal plane and spaced apart at a distance greater than 0.75 m in each of the driving configurations of the cab.

2. Vehicle according to claim 1, wherein the central longitudinal plane defines a first side of the base and a second side of the base, the median plane of the seat being located on the first side of the base in at least one of the driving configurations of the cab and on the second side of the base in at least one other of the driving configurations of the cab.

3. Vehicle according to claim 1, wherein the assembly is movable between at least a front position and a rear position, the assembly being rotated through an angle equal to 180° about the first axis between the front position and the rear position.

4. Vehicle according to claim 1, wherein the assembly is designed to rotate about the first axis through an angular range less than or equal to 270°.

5. Vehicle according to claim 1, wherein the seat is designed to rotate relative to the base about a second axis, the second axis extending in the elevation direction, the second axis being distinct from the first axis.

6. Vehicle according to claim 5, wherein the base comprises a platform, the seat resting on the platform via a secondary bearing system, the secondary bearing system comprising at least one locking member of the secondary bearing system in at least two positions of the seat relative to the platform.

7. Vehicle according to claim 5, wherein the seat is designed to rotate about the second axis through an angular range equal to 90°.

8. Vehicle according to claim 1, wherein the base rests on a fixed support relative to the body according to the elevation direction, the base resting on the support via a bearing system, the bearing system comprising at least one locking member of the bearing system in at least one position of the base relative to the support.

9. Vehicle according to claim 1, wherein the cab comprises a console, the console being disposed to be fixed relative to the seat.

\* \* \* \* \*